United States Patent
Dwyer et al.

(10) Patent No.: US 11,841,059 B2
(45) Date of Patent: Dec. 12, 2023

(54) HYDRAULIC POWERTRAIN COMPONENT MOUNT WITH VARIABLE STIFFNESS

(71) Applicants: Brian D Dwyer, Ortonville, MI (US); Mitchell G Marozzi, Auburn Hills, MI (US); Jeffrey M Orzechowski, Troy, MI (US); Neelan A Nadesan, Waterford, MI (US); Jason Kolenda, Belding, MI (US)

(72) Inventors: Brian D Dwyer, Ortonville, MI (US); Mitchell G Marozzi, Auburn Hills, MI (US); Jeffrey M Orzechowski, Troy, MI (US); Neelan A Nadesan, Waterford, MI (US); Jason Kolenda, Belding, MI (US)

(73) Assignee: FCA US LLC, Auburn Hills, MI (US)

( * ) Notice: Subject to any disclaimer, the term of this patent is extended or adjusted under 35 U.S.C. 154(b) by 50 days.

(21) Appl. No.: 17/518,751

(22) Filed: Nov. 4, 2021

(65) Prior Publication Data

US 2023/0134946 A1    May 4, 2023

(51) Int. Cl.
| | |
|---|---|
| *F16D 13/26* | (2006.01) |
| *B60K 5/12* | (2006.01) |
| *F16D 13/14* | (2006.01) |
| *F16F 13/26* | (2006.01) |
| *F16F 13/14* | (2006.01) |

(52) U.S. Cl.
CPC .......... *F16F 13/262* (2013.01); *B60K 5/1283* (2013.01); *F16F 13/1463* (2013.01); *F16F 13/1481* (2013.01)

(58) Field of Classification Search
CPC ............... F16F 13/1427; F16F 13/1463; F16F 13/1481; F16F 13/262; F16F 13/264; B60K 5/1283
See application file for complete search history.

(56) References Cited

U.S. PATENT DOCUMENTS

| | | | |
|---|---|---|---|
| 4,583,723 A | 4/1986 | Ozawa | |
| 4,793,599 A | 12/1988 | Ishioka | |
| 5,839,720 A * | 11/1998 | Kojima | ................... F16F 13/26 267/140.14 |
| 6,036,183 A | 3/2000 | Lee et al. | |
| 7,717,409 B2 | 5/2010 | Ishiguro et al. | |
| 9,074,653 B2 | 7/2015 | Gannon et al. | |
| 2006/0006593 A1 * | 1/2006 | Bretaudeau | ........... F16F 13/268 267/140.14 |

(Continued)

*Primary Examiner* — Thomas J Williams
(74) *Attorney, Agent, or Firm* — Jeremy J. Klobucar (57) ABSTRACT

A powertrain component mount includes a housing, a main rubber element, a hydraulic body, a membrane and a valve. The main rubber element has an outer armature, an inner armature and an isolating element coupled to the armatures, the isolating element being formed of a material that is more flexible than the outer armature and the inner armature, wherein the main rubber element defines at least part of a fluid flow path. The hydraulic body supports the outer armature of the main rubber element, defines part of the fluid flow path, a fluid chamber, and part of a control chamber communicated with the fluid flow path. The hydraulic body has a port open to the control chamber. The membrane defines part of the control chamber and the valve has a valve head movable between a first position closing the port and a second position spaced from the port.

18 Claims, 5 Drawing Sheets

(56) References Cited

U.S. PATENT DOCUMENTS

| | | | |
|---|---|---|---|
| 2014/0346722 A1 | 11/2014 | Bradshaw et al. | |
| 2015/0233443 A1* | 8/2015 | Lemaire | F16F 13/10 |
| | | | 267/140.14 |
| 2019/0063543 A1* | 2/2019 | Raida | F16F 13/26 |
| 2023/0134946 A1* | 5/2023 | Dwyer | B60K 5/1208 |
| | | | 267/140.3 |

* cited by examiner

HYDRAULIC POWERTRAIN COMPONENT MOUNT WITH VARIABLE STIFFNESS

FIELD

The present disclosure relates to a powertrain mount that includes hydraulic fluid and a valve operable to change the stiffness of the mount.

BACKGROUND

Vehicle powertrain components are coupled to a structural assembly of the vehicle by a plurality of mounts, at least some of which may be compliant to damp forces and vibrations transmitted in the vehicle. Mounts having a single stiffness must be designed to handle high torque loads and thus, may be stiffer than desired in managing other loads between the vehicle and powertrain component(s). Soft mounts do not adequately dissipate forces and vibrations during some vehicle operating conditions or events, like restarting a vehicle engine by a vehicle start-stop system.

SUMMARY

In at least some implementations, a powertrain component mount assembly includes a housing, a main rubber element (MRE), a hydraulic body, a membrane and a valve. The MRE has an outer armature, an inner armature and an isolating element coupled to the outer armature and to the inner armature, the isolating element being formed of a material that is more flexible than the outer armature and the inner armature to permit relative movement between the inner armature and the outer armature, wherein the main rubber element defines at least part of a fluid flow path having a first end and a second end. The hydraulic body is connected to the housing and supports the outer armature of the MRE, the hydraulic body defines part of the fluid flow path, a fluid chamber that is communicated with the fluid flow path, and part of a control chamber communicated with the fluid flow path between the first end and the fluid chamber, and the hydraulic body has a port open to the control chamber. The membrane defines part of the control chamber and is arranged between the port and the fluid flow path. The valve has a valve head movable relative to the port between a first position closing the port and a second position spaced from the port.

In at least some implementations, the valve is electrically operated and the valve head is moved relative to the port in response to application of electricity to the valve.

In at least some implementations, the membrane is carried by and sealed to the hydraulic body. In at least some implementations, part of the membrane moves relative to the port, and wherein when the valve head is in the second position and fluid in the fluid flow path acts on the membrane, the membrane flexes relative to the fluid flow path and inhibits or prevents fluid flow in the fluid flow path. In at least some implementations, when the valve head is in the first position air in the control chamber cannot exit the control chamber through the port and the membrane is inhibited or prevented from movement toward the port, and the membrane permits fluid flow in the fluid flow path. In at least some implementations, movement between the inner armature and the outer armature is suppressed when the valve head is in the first position compared to when the valve head is in the second position.

In at least some implementations, the valve is electrically operated, the valve head is in the second position when electricity is not supplied to the valve, and the valve head is moved to the first position when electricity is supplied to the valve.

In at least some implementations, the housing includes a first connection point adapted to be connected to one of a vehicle structural component or a powertrain component, and the inner armature includes a second connection point adapted to be connected to the other of the vehicle structural component or powertrain component.

In at least some implementations, the fluid flow path is defined between overlapped surfaces of the outer armature, the hydraulic body, and a fluid flow path cover, the fluid flow path being defined in part by a groove formed in the hydraulic body. In at least some implementations, the fluid in the fluid flow path is a hydraulic liquid.

In at least some implementations, air is present within the control chamber and when the valve head is in the first position the valve head inhibits or prevents air from flowing through the port to inhibit or prevent movement of the membrane.

In at least some implementations, the assembly includes an accumulator body coupled to the hydraulic body and defining part of the fluid chamber, the accumulator body having at least a portion that moves the change the volume of the fluid chamber.

In at least some implementations, a vehicle assembly includes a structural component, a powertrain component and a mount. The mount is connected at a first connection point to the structural component and at a second connection point to the powertrain component. The mount includes a housing including the first connection point, a MRE, a hydraulic body, a membrane and a valve. The MRE has an outer armature, an inner armature including the second connection point, and an isolating element coupled to the outer armature and to the inner armature, the isolating element being formed of a material that is more flexible than the outer armature and the inner armature to permit relative movement between the outer armature and inner armature, wherein the main rubber element defines at least part of a fluid flow path having a first end and a second end. The hydraulic body is connected to the housing and supports the outer armature of the MRE. The hydraulic body defines part of the fluid flow path, at least part of a fluid chamber, part of a control chamber communicated with the fluid flow path between the first end and the fluid chamber, and the hydraulic body has a port open to the control chamber. The membrane defines part of the control chamber and is arranged between the port and the fluid flow path so that fluid in the fluid flow path does not flow through the port. And the valve has a valve head movable relative to the port between a first position closing the port and a second position spaced from the port.

In at least some implementations, air is present within the control chamber and when the valve head is in the first position the valve head inhibits or prevents air from flowing through the port to inhibit or prevent movement of the membrane. In at least some implementations, the membrane is carried by and sealed to the hydraulic body.

In at least some implementations, the membrane is formed from an elastic material and part of the membrane moves relative to the port, and wherein when the valve head is in the second position and fluid in the fluid flow path acts on the membrane, the membrane flexes relative to the fluid flow path and inhibits or prevents fluid flow in the fluid flow path. In at least some implementations, when the valve head is in the first position air in the control chamber cannot exit the control chamber through the port and the membrane is inhibited or prevented from movement toward the port, and the membrane permits fluid flow in the fluid flow path. In at least some implementations, movement between the inner armature and the outer armature is suppressed when the valve head is in the first position compared to when the valve head is in the second position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
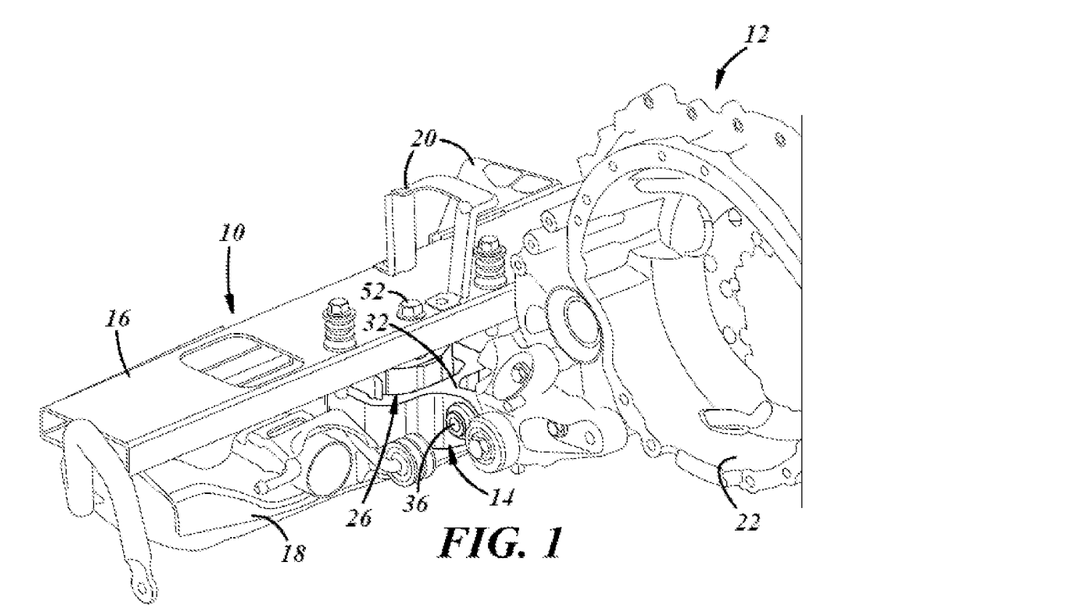
FIG. 1 is a perspective view showing a portion of a vehicle structural assembly, a portion of a powertrain component and a mount coupling the powertrain component to the structural assembly.
Figure 2:
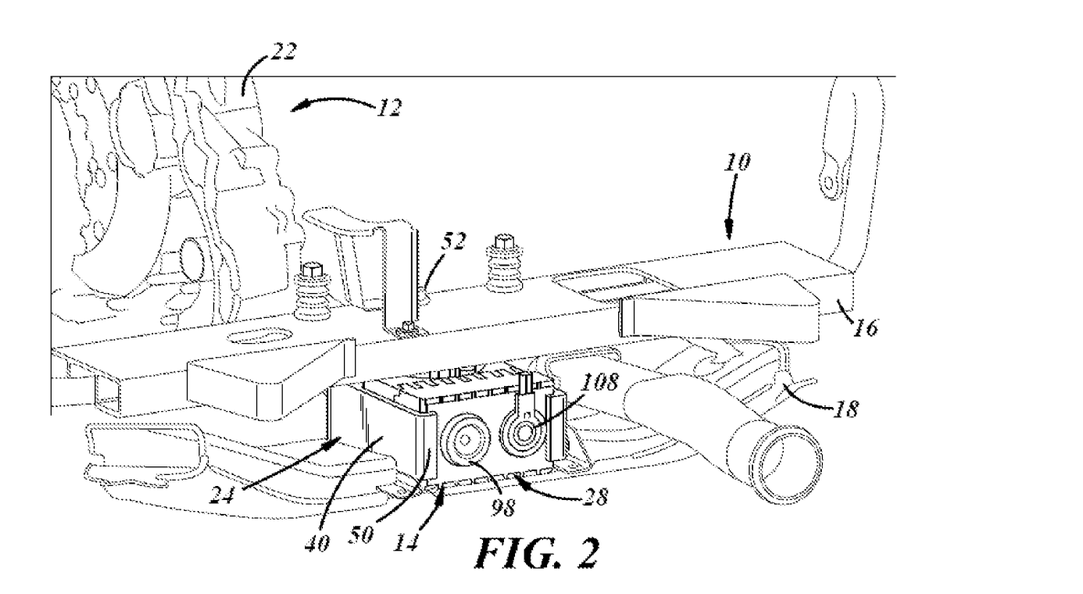
FIG. 2 is another perspective view of the components shown in FIG. 1.

Referring in more detail to the drawings, FIG. 1 shows a portion of a motor vehicle including a portion of a vehicle structural assembly 10, part of a powertrain component 12 and a mount 14 by which the powertrain component 12 is coupled to the structural assembly 10. The portion of the vehicle structural assembly 10 shown includes two main structural components, called herein upper and lower frame members 16, 18, and also other brackets 20 and connectors for various vehicle components. The portion of the powertrain component 12 shown in FIGS. 1 and 2 is part of a housing 22 for a vehicle transmission 12, although the mount 14 may be used to couple other powertrain components (e.g. an engine) to the vehicle structural assembly 10. In at least some implementations, the powertrain component 12 (e.g. engine and/or transmission) is mounted transversely, and the upper and lower frame members 16, 18 shown in FIGS. 1 and 2 are oriented in a cross-car direction, perpendicular to a forward direction of travel of the vehicle. Of course, other arrangements may be used, as desired. As set forth in more detail below, the mount 14 includes compliant components that damp vibrations and forces that would otherwise be distributed from the transmission to the structural components 16, 18.

As shown in more detail in FIGS. 3-6, the mount 14 includes a housing 24, a main rubber element (MRE) 26 and a hydraulic body 28 carried by the housing 24. The housing 24 has a first connection point 30 by which the housing 24 is coupled to one of the powertrain components 12 or structural assembly 10. In the example shown in the drawings, the housing 24 includes a flange 32 that extends outwardly and the first connection point 30 is defined by an opening 34 through the flange 32. As shown in FIG. 1, a connector such as a bolt 36 extends through the opening 34 and is coupled to the transmission housing 22 such that the flange 32 is trapped between a head of the bolt 36 and the transmission housing 22. A bushing 38 or other compliant member may be received in the opening 34, and the bolt 36 may extend through the bushing 38 for a compliant, vibration-damped connection between the bolt 36 and housing 24.

The housing 24 may include two sidewalls 40 coupled together at a first end 42 by a base 44 providing a generally U-shaped housing 24, with the flange 32 extending from a side 46 of the base 44 opposite to the side 48 that defines part of an area in which the MRE 26 is received. The sidewalls 40 may each extend to a second end 50, and the second ends 50 of the sidewalls 40 may be spaced apart from each other. The mount 14 may be connected to one or both of the upper and lower frame members 16, 18. In the example shown, at least part of the housing 24 is received between the frame members 16, 18, and the mount 14 is coupled to both frame members by a connector, such as a bolt 52 (FIGS. 1 and 2), extending through the frame members and the MRE 26.

The MRE 26 is received between the housing 24 sidewalls 40 and in use, at least part of the MRE 26 moves relative to the housing 24. The MRE 26 has an outer armature 54 carried by or constrained by the housing 24, an inner armature 56, and an isolating element 58 coupled to the outer armature 54 and to the inner armature 56. The outer armature 54 is connected to and supports the isolating element 58 which in turn is connected to and supports the inner armature 56 such that the inner armature 56 is not directly engaged with the outer armature 54 and is indirectly connected to the outer armature 54 via the isolating element 58. To permit relative movement between the inner armature 56 and both the outer armature 54 and the housing 24, the isolating element 58 is formed of a material that is more flexible or compliant than is the outer armature 54 and the inner armature 56. For example, the isolating element 58 may be formed of an elastomer like rubber (which may be reinforced as desired) and may be overmolded onto the outer armature 54 and over or around the inner armature 56. In at least some implementations, such as is shown and labeled in FIG. 4, the isolating element 58 may include a layer 59 of material overlying all or part of an end face 60 of the outer armature 54, a web 62 of material extending between the outer armature 54 and the inner armature 56, and a layer 63 of material surrounding at least part of the exterior of the inner armature 56. In at least some implementations, the isolating element 58 does not cover opposite first and second end faces 64, 66 of the inner armature 56, but does cover most or all of the sidewall 68 of the inner armature 56 which defines a periphery of the inner armature 56 and extends between the end faces 64, 66. In the example shown, the web 62 of the isolating element 58 has a thickness less than the distance between the end faces 64, 66 of the inner armature 56, and less than the thickness of first and second end faces 60, 70 of the outer armature 54. The thickness and material properties of the web 62 can be adjusted as desired to change the damping properties thereof, and change the magnitude of movement of the inner armature 56 relative to the outer armature 54 under a given force. So arranged, the inner armature 56 does not directly engage the outer armature 54 and the flexible isolating element 58 permits movement of the inner armature 56 relative to the outer armature 54.

The inner armature 56 may be suspended within the housing 24 by the isolating element 58 so that the inner armature 56 is separate from and not directly connected to the housing 24, and the inner armature 56 may move relative to the housing 24. The inner armature 56 may be formed of metal or other material capable of handling the loads on the inner armature 56. To connect the mount 14 to either the powertrain component 12 or one or both of the structural members 16, 18, the inner armature 56 includes a second connection point 72. In the example shown, the second connection point 72 is a hole in or through the inner armature 56, shown as a hole 72 extending through the end faces 64, 66, spaced inwardly from the periphery of the inner armature 56. In assembly, the bolt 52 is received in the hole 72 and couples the inner armature 56 to the structural member(s) 16 and/or 18. So arranged, forces and vibrations from the transmission housing 22 are transmitted to the structural component(s) 16 and/or 18 via the MRE 26, wherein the flexible isolating element 58 provides a damped connection (as does any bushing 38 or compliant member between the housing 24 and bolt 36). Movement of the inner armature 56 relative to the housing 24 may be limited by surfaces of the housing 24, which may be engaged by the MRE 26 as relative movement occurs between the housing 24 and inner armature 56. To damp noise and forces from engagement of the MRE 26 with the housing 24, surfaces of the inner armature 56 that may engage the housing 24 may be coated by a compliant member which may be a portion of the isolating element 58 as described above, or separate or discrete compliant members, as desired. In the example shown, the hole 72 extends perpendicularly to the opening 34 in the housing 24, although other orientations may be used.

The outer armature 54 of the MRE 26 may be constrained against movement by the housing 24, and by the hydraulic body 28 that is coupled to the housing 24. In at least some implementations, to couple the hydraulic body 28 and outer armature 54, the outer armature 54 has, spaced about its periphery, a plurality of voids 53 (FIGS. 4, 5 and 9) with retaining surfaces 55 (FIG. 9), and the hydraulic body 28 includes a plurality of fingers 57 (FIGS. 4, 5, 7 and 8) adapted to be partially received in the voids 53 and having latches 59 (FIGS. 7 and 8) that are snap-fit over and retained by the retaining surfaces 55. In the example shown, the housing 24 includes ribs 74 that extend inwardly from the sidewalls 40, and the outer armature 54 is trapped between these ribs 74 and the hydraulic body 28. To damp vibrations, damping material, which may be material of the isolating element 58, may be provided between the outer armature 54 and the ribs 74 (e.g. by overmolding that portion of the outer armature 54 with the material of the isolating element 58). A cavity 76 (FIG. 3) may be formed in the end face 60 of the outer armature that is closest to the inner armature 56, and the cavity 76 may be partially circular, such as semi-circular. A portion of the inner armature 56 may extend into the cavity 76 but remain spaced from the end face 60, for example, a portion of the inner armature 56 may intersect a plane 78 (FIG. 3) parallel to and including the end face 60 of the outer armature 54. The web 62 between the first and inner armatures 54, 56 may follow the contour of the outer armature 54 and extend around the adjacent portion of the inner armature 56 providing support for the inner armature 56 (via attachment of the web 62) over an angular range of between 90 and 360 degrees.

Figure 3:
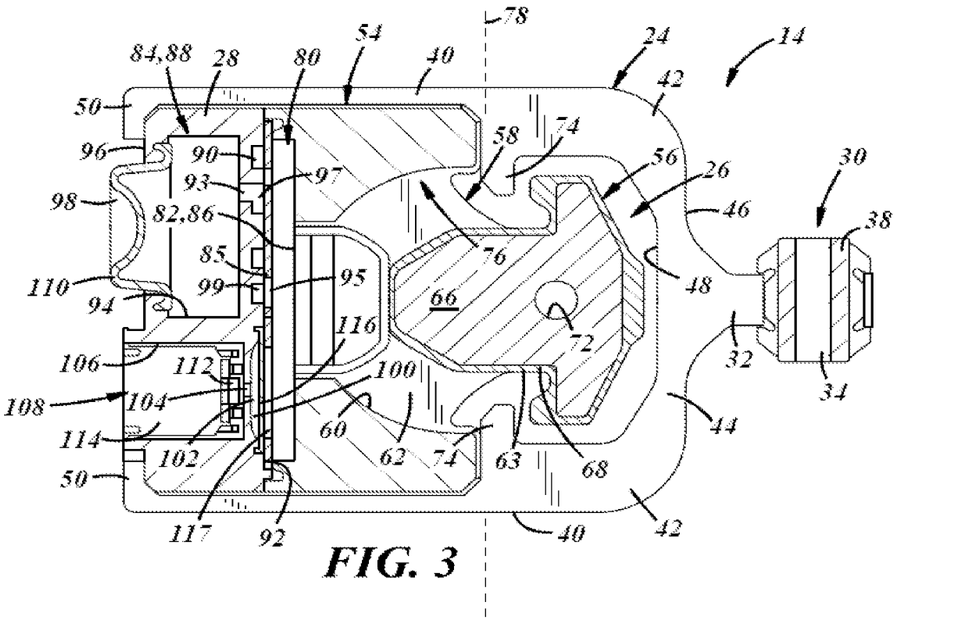
FIG. 3 is a sectional view of the mount.
Figure 4:
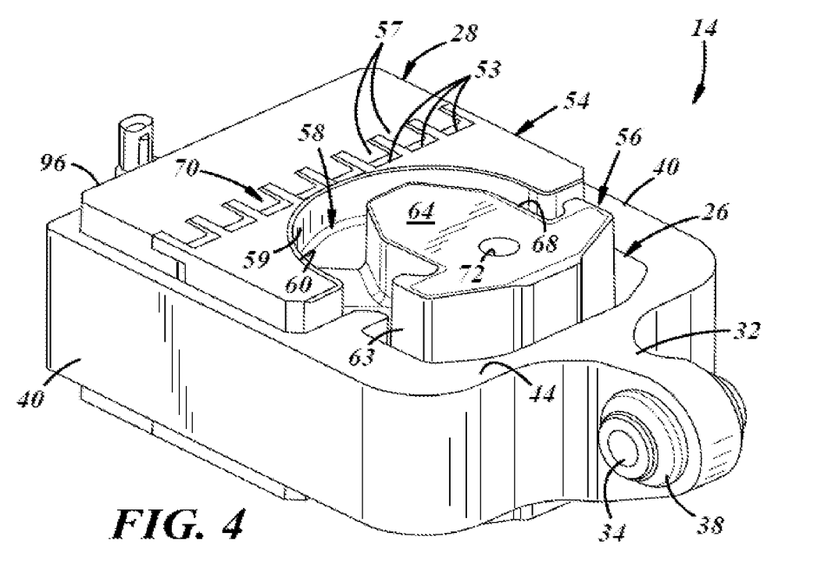
FIG. 4 is a perspective view of the mount.
Figure 5:
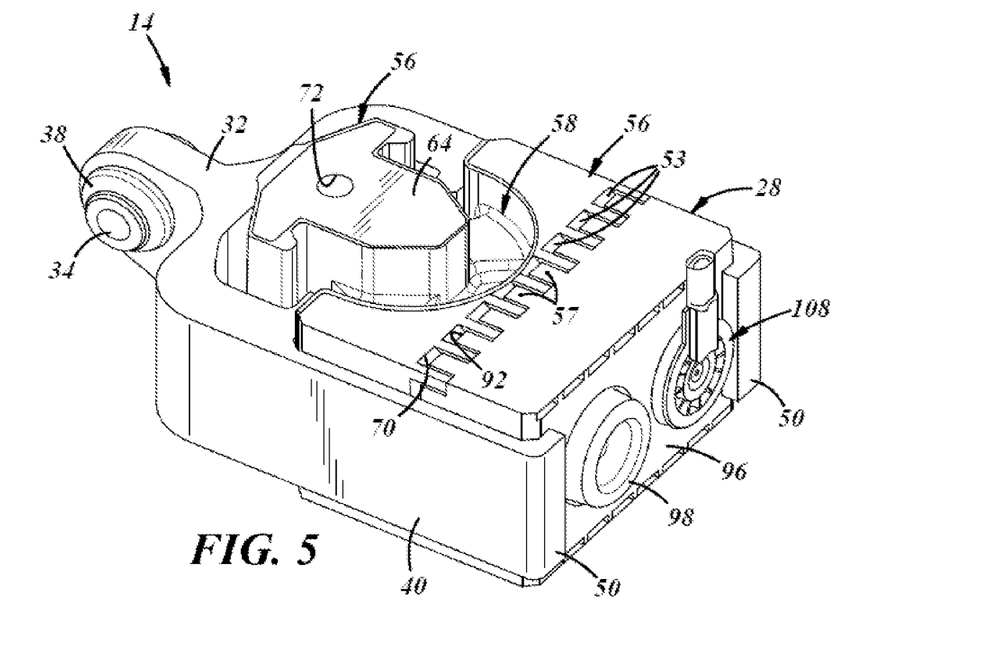
FIG. 5 is another perspective view of the mount showing an accumulator body and a valve carried by the mount.
Figure 6:
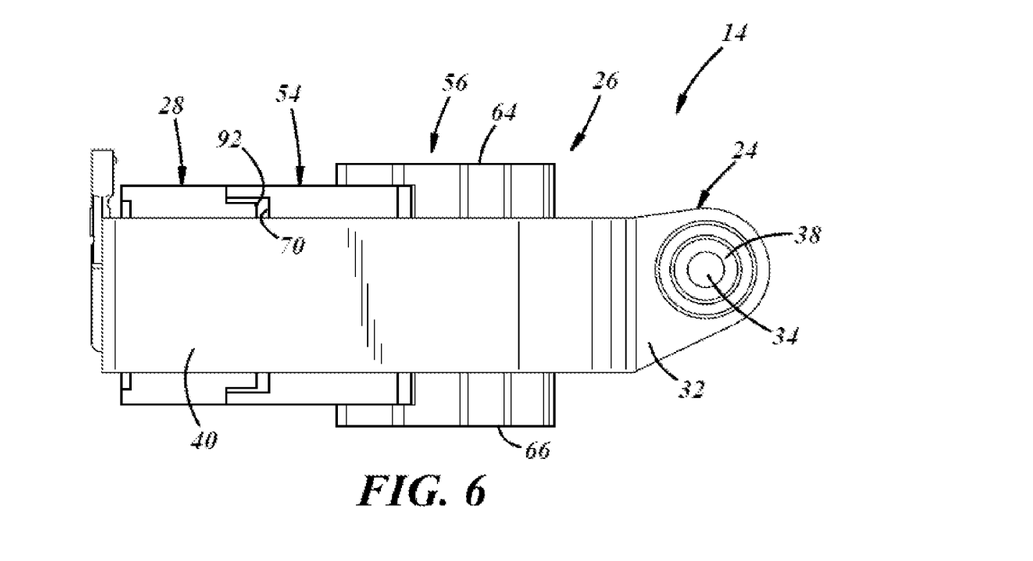
FIG. 6 is a side view of the mount.
Figure 7:
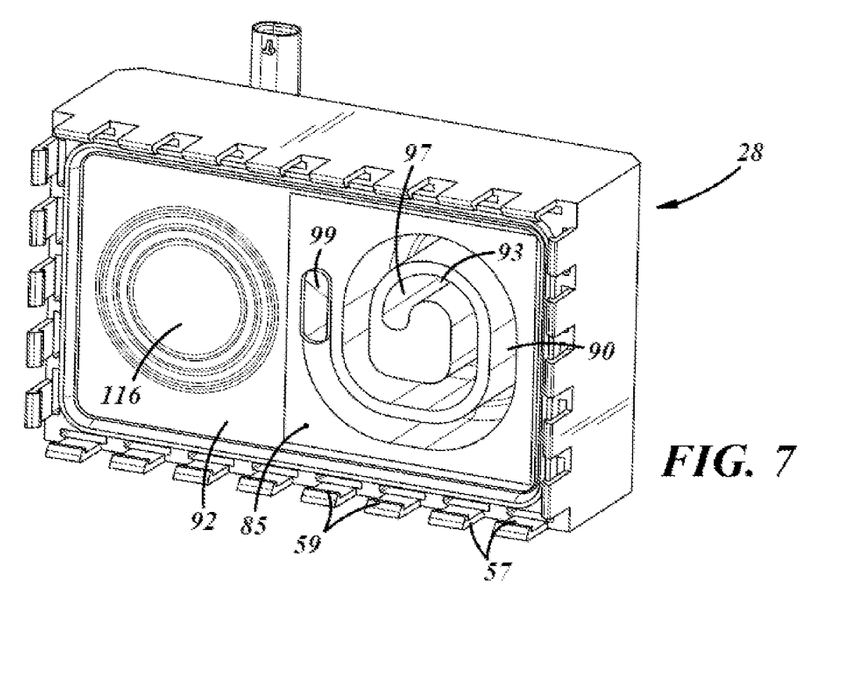
FIG. 7 is a perspective view of a hydraulic body of the mount showing an upper surface of the hydraulic body.

As shown in FIG. 3, the outer armature 54 of the MRE 26, the hydraulic body 28 and a fluid flow path cover 85 define at least part of a fluid flow path 80 having a first end 82 and a second end 84. The first end 82 of the fluid flow path 80 may lead to or be defined in part by the isolating element 58 of the MRE 26, which, with the outer armature 54 and cover 85, may define a first fluid chamber 86 between them. The second end 84 of the fluid flow path 80 may lead to or be defined by a second fluid chamber 88 defined at least partially between the cover 85 and the hydraulic body 28. Between the ends, the fluid flow path 80 may be defined by a passage created by one or more of the outer armature 54, the cover 85 and hydraulic body 28. In at least some implementations, such as the one shown in the drawings, the fluid flow path 80 is defined in part by a groove 90 (FIGS. 3 and 7) formed in the face 92 of the hydraulic body 28 that is overlapped by the cover 85. As shown in FIG. 7, the groove 90, for example at a first end 97 of the groove, leads to a port 93 in the hydraulic body 28 that is open to the second fluid chamber 88 and which is overlapped/enclosed by the cover 85. Spaced from the port 93, for example at a second end 99 of the groove 90, the groove 90 leads to or is otherwise communicated with an opening 95 (FIGS. 3 and 8) through the cover 85 that is open to or otherwise communicated with the first fluid chamber 86. Thus, fluid flows between the fluid chambers 86, 88 through the fluid flow path 80. The fluid flow path 80 may be a convoluted, serpentine or spiral flow path, as desired to provide a desired fluid flow resistance for a given force input. A liquid (e.g. a hydraulic liquid) is received within the fluid flow path 80 and liquid flows between the first fluid chamber 86 and second fluid chamber 88 and within the groove 90 when there is relative movement between the housing 24 and the second and isolating elements 56, 58 of the MRE 26, as will be described in more detail later.

The hydraulic body 28, as stated above, is coupled to the housing 24 and to the outer armature 54 of the MRE 26. In the example shown, the second ends 50 of the housing 24 sidewalls 40 are bent around an outer end of the hydraulic body 28, with the MRE 26 outer armature 54 and hydraulic body 28 trapped together between the ribs and second ends 50 of the sidewalls 40. As shown in FIG. 3, a first void 94 in the hydraulic body 28 defines part of the second fluid chamber 88. The first void 94 extends into the hydraulic body 28 from an outer face 96. The first void 94 is enclosed at its open end by an accumulator body 98 that is coupled to the hydraulic body 28 (to define an accumulator) and is open to the port 93. A second void 100 in the hydraulic body 28, spaced from the first void 94, defines part of a control chamber 102. A port 104 extends between the second void 100 and a valve cavity 106 in which a valve 108 is received.

The accumulator (herein referred to as an accumulator body) 98 may be a flexible, diaphragm type body sealed about its periphery to the hydraulic body 28 and having a convolution or bellows 110 spaced from the periphery that permits a portion of the accumulator body 98 to move relative to the hydraulic body 28. The accumulator body 98 may be formed from an elastomeric material, such as rubber, and may be spring biased to alter the pressure or force needed to cause a given amount of movement of the accumulator body 98. In the example shown, no spring is used and the exterior of the accumulator body 98 is open to the ambient environment and acted upon by ambient/atmospheric pressure. Movement of the accumulator body 98 changes the volume of the second fluid chamber 88 to accommodate movement of liquid between the first fluid chamber 86 and second fluid chamber 88.

The valve 108 includes a valve head 112 that is movable relative to the port 104 from a first position wherein fluid flow through the port 104 is inhibited or prevented, to a second position in which the valve head 112 is spaced from the port 104 and a greater fluid flow rate is possible through port 104. In at least some implementations, the valve 108 is a solenoid valve which changes the position of the valve head 112 when electricity is supplied to the valve 108. In at least some implementations, the valve head 112 is in the second position when electricity is not supplied to the valve 108, and the valve head 112 is moved to the first position when electricity is supplied to the valve 108. Of course, other arrangements and control schemes may be used as is known with solenoid valves 108. The valve 108 may include a housing 114 that is at least partially received in the valve cavity 106, and the valve 108 may be connected to and totally supported by the hydraulic body 28, if desired. To facilitate electrically connecting the valve 108, an end of the valve 108 may be exposed from the outer end of the hydraulic body 28.

Figure 8:
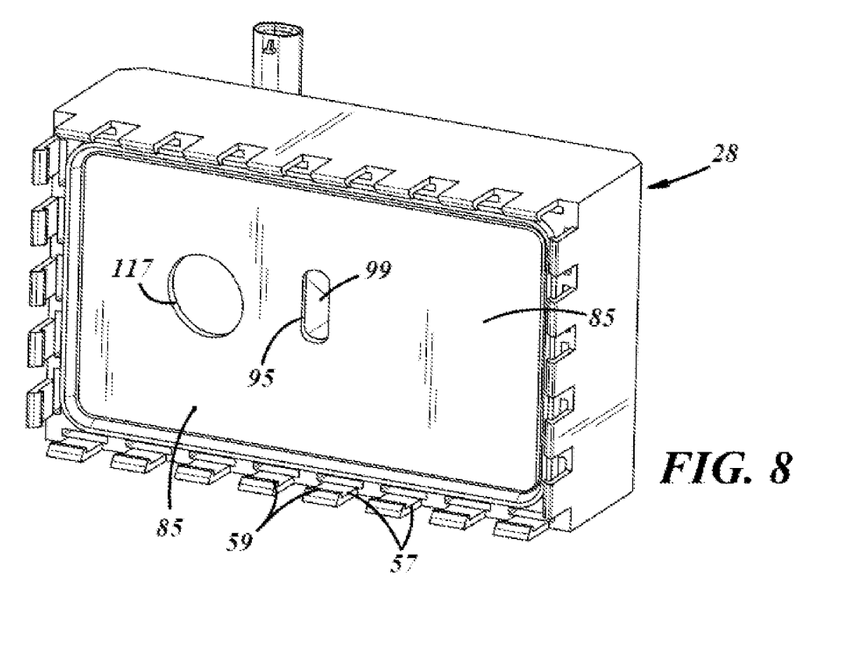
FIG. 8 is a perspective view of the hydraulic body with a cover over the upper surface.
Figure 9:
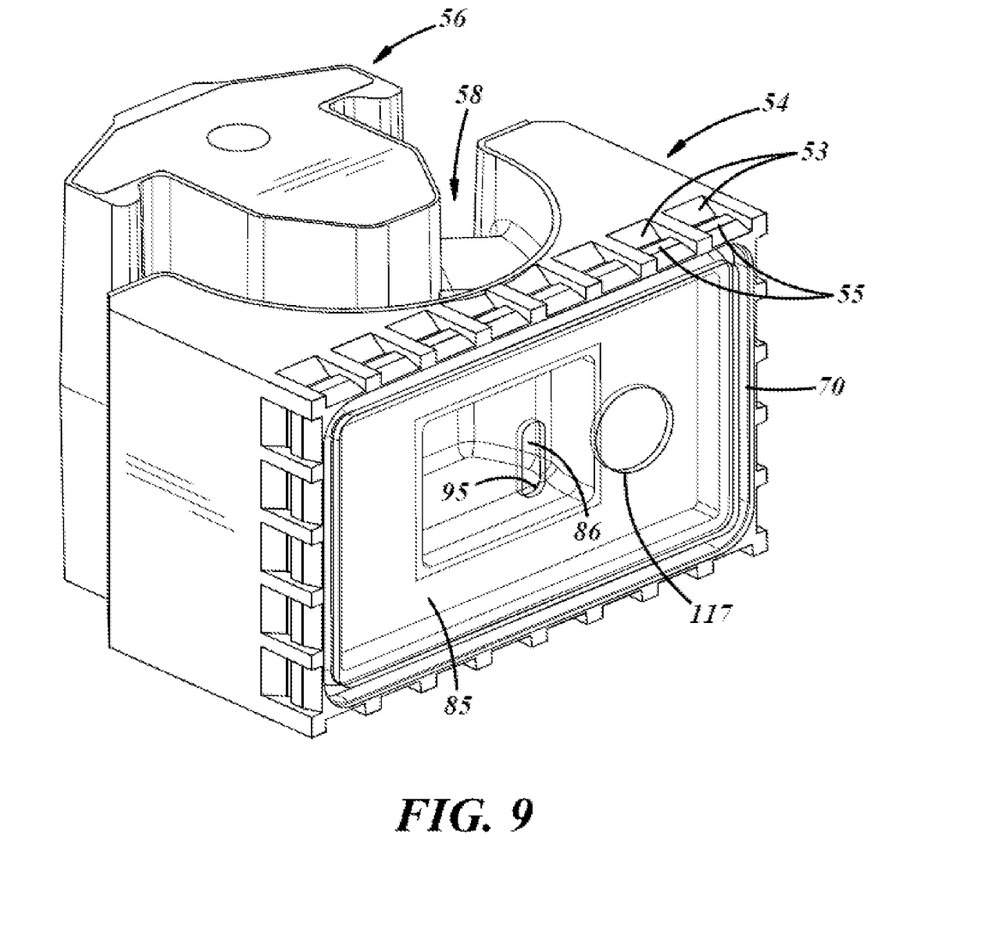
FIG. 9 is a perspective view of a main rubber element of the mount, showing a bottom surface of an outer armature.

Finally, a membrane 116 may be received between the cover 85 and the hydraulic body 28. In at least some implementations, the membrane 116 is a circular disc of flexible material that is carried by and sealed about its periphery to the hydraulic body 28 overlying the second void 100, and with the cover 85, defines the control chamber 102 on one side of the membrane 116. The opposite side of the membrane 116 is communicated with and may define part of the fluid flow path 80, such as by a passage or port 117 formed through the plate as shown in FIGS. 3, 8 and 9. Alternatively, as shown in FIG. 7, the cover 85 may extend over only the groove and not also over the membrane 116. The membrane 116 is impervious to the liquid in the fluid flow path 80 such that the control chamber 102 is devoid of liquid and instead air is received in the control chamber 102. In at least some implementations, the membrane 116 is located in or at a portion of the fluid flow path 80 that is between the first fluid chamber 86 and second fluid chamber 88, and the membrane 116 is arranged to control fluid flow through the fluid flow path 80 and between the fluid chambers.

In more detail, when the valve head 112 is in the second position, fluid flowing in the fluid flow path 80 acts on the membrane 116 and moves the membrane 116 relative to the fluid flow path 80. Movement of the membrane 116 is permitted as the port 104 is open and air can flow in and out of the control chamber 102 as the membrane 116 moves. Movement of the membrane 116, which may be toward and away from the port 104, interferes with liquid flow in the fluid flow path 80, for example, by causing turbulence in the flow which inhibits or prevents fluid flow in the fluid flow path 80 and between the fluid chambers 86, 88. In this state, the mount 14 is soft as the additional compliance beyond the flexibility of the isolating element 58 of the MRE 26, which is provided by the flowing liquid in the mount 14, is lessened or prevented.

When the valve head 112 is in the first position, which in the implementation shown occurs when electricity is supplied to the valve 108, the valve head 112 inhibits or prevents air from flowing through the port 104. Air is thus trapped in the control chamber 102 and movement of the membrane 116 is inhibited or prevented. Without movement, or at least significant movement of the membrane 116, fluid flow in the fluid flow path 80 is not interrupted or inhibited. In this state, the mount 14 is stiffer as movement of the MRE 26 occurs less easily as such MRE 26 movement displaces liquid in the fluid flow path 80. Such fluid flow may cause additional liquid to be received in the second fluid chamber 88, with corresponding movement/expansion of the accumulator body 98, which may provide a return force on the liquid when the pressure/forces in the mount 14 permit such movement.

The state of the valve 108, and hence the state of the mount 14, can be changed as desired to provide a desired stiffness of the mount 14 in a wide range of vehicle operating conditions. For example, many modern vehicles include electric stop-start systems that turn the engine off when the vehicle is stopped, and start the engine up again to permit continued driving of the vehicle. In these situations, the valve 108 can be actuated to cause the valve head 112 to be in the first position, which provides a stiffer, less compliant mount 14. Then, when staying in this state and when the vehicle starter is actuated to restart the engine, the attendant harsh vibrations from the starter pulse and initial engine turnover can be better accommodated and damped by the mount 14. This reduces vibrations and noise upon engine restarting so that such vibrations and noise are less noticeable by vehicle occupants.

Thereafter, the valve 108 may be deactuated (electricity no longer supplied thereto) to cause or permit the valve head 112 to move to the second position, which provides a softer, more compliant mount 14. In this state, the mount 14 is better able to handle higher torque loads that may occur in higher speed driving of the vehicle.

Accordingly, a control scheme may be employed to provide the mount 14 in a desired state based upon an instantaneous or anticipated vehicle operating condition. In low speed driving, or when the vehicle is coasting, or when the vehicle is in an engine idle situation, or in any other situation when a more compliant mount 14 is desirable, the valve 108 may be actuated so that the mount 14 is less stiff and more compliant. In other driving conditions when a stiff mount 14 is needed to manage high torque loads in the system, the valve head 112 may be moved or permitted to move to its first position.

Further, the mount 14 may be calibrated or tuned to provide a desired damping response. The volume of hydraulic liquid in the system, shape, length and size of the fluid flow path 80, accumulator body 98 characteristics (e.g. resiliency, stiffness) and other factors may be adjusted as desired. The controllable mount 14 can enable elimination of other components, like transmission auxiliary pumps and/or cam shaft e-phasers, which may be used in some applications to counter vehicle vibrations and torque reactions.

What is claimed is:
1. A powertrain component mount assembly, including:
a housing;
a main rubber element having an outer armature, an inner armature and an isolating element coupled to the outer armature and to the inner armature, the isolating element being formed of a material that is more flexible than the outer armature and the inner armature to permit relative movement between the inner armature and the outer armature, wherein the main rubber element defines at least part of a fluid flow path having a first end and a second end;
a hydraulic body connected to the housing and supporting the outer armature of the main rubber element, the hydraulic body defining part of the fluid flow path, the hydraulic body defining at least part of a fluid chamber that is communicated with the fluid flow path, the hydraulic body defining part of a control chamber, and the hydraulic body having a port open to the control chamber;

a membrane defining part of the control chamber and arranged between the port and the fluid flow path so that fluid in the fluid flow path does not flow through the port; and a valve having a valve head movable relative to the port between a first position closing the port and a second position spaced from the port, wherein the control chamber is spaced from the fluid chamber, and the membrane is solid and without any openings through the membrane, wherein the control chamber is spaced from the fluid chamber in a direction perpendicular to the direction of movement of the valve head so that the control chamber does not overlap the fluid chamber in the direction of movement of the valve head.

2. The assembly of claim 1 which also includes an accumulator body coupled to the hydraulic body and defining part of the fluid chamber, the accumulator body having at least a portion that moves to change the volume of the fluid chamber, and wherein the accumulator body is formed without any openings, and is sealed to the hydraulic body about a periphery of the accumulator body.

3. The assembly of claim 1 wherein the membrane is carried by and sealed to the hydraulic body.

4. The assembly of claim 3 wherein part of the membrane moves relative to the port, and wherein when the valve head is in the second position and fluid in the fluid flow path acts on the membrane, the membrane flexes relative to the fluid flow path and inhibits or prevents fluid flow in the fluid flow path.

5. The assembly of claim 4 wherein when the valve head is in the first position air in the control chamber cannot exit the control chamber through the port and the membrane is inhibited or prevented from movement toward the port, and the membrane permits fluid flow in the fluid flow path.

6. The assembly of claim 5 wherein movement between the inner armature and the outer armature is suppressed when the valve head is in the first position compared to when the valve head is in the second position.

7. The assembly of claim 1 wherein air is present within the control chamber and when the valve head is in the first position the valve head inhibits or prevents air from flowing through the port to inhibit or prevent movement of the membrane.

8. The assembly of claim 1 wherein the housing includes a first connection point adapted to be connected to one of a vehicle structural component or a powertrain component, and the inner armature includes a second connection point adapted to be connected to the other of the vehicle structural component or powertrain component.

9. A powertrain component mount assembly, including:
a housing;
a main rubber element having an outer armature, an inner armature and an isolating element coupled to the outer armature and to the inner armature, the isolating element being formed of a material that is more flexible than the outer armature and the inner armature to permit relative movement between the inner armature and the outer armature, wherein the main rubber element defines at least part of a fluid flow path having a first end and a second end;
a hydraulic body connected to the housing and supporting the outer armature of the main rubber element, the hydraulic body defining part of the fluid flow path, the hydraulic body defining at least part of a fluid chamber that is communicated with the fluid flow path, the hydraulic body defining part of a control chamber, and the hydraulic body having a port open to the control chamber;
a membrane defining part of the control chamber and arranged between the port and the fluid flow path so that fluid in the fluid flow path does not flow through the port;
a valve having a valve head movable relative to the port between a first position closing the port and a second position spaced from the port, wherein the control chamber is spaced from the fluid chamber, and the membrane is solid and without any openings through the membrane; and
a cover received between the outer armature and the hydraulic body, wherein the fluid flow path is defined at least in part by a groove formed in the hydraulic body, and the cover overlaps the groove, the groove and cover define a convoluted, serpentine or spiral flow path, and the cover includes a first opening that communicates with the groove and another fluid chamber defined at least in part by the plate and the outer armature.

10. The assembly of claim 9 wherein the cover includes a second opening through which said another fluid chamber communicates with membrane.

11. A vehicle assembly, comprising:
a structural component;
a powertrain component; and
a mount connected at a first connection point to the structural component and at a second connection point to the powertrain component, the mount including:
a housing including the first connection point;
a main rubber element having an outer armature, an inner armature including the second connection point, and an isolating element coupled to the outer armature and to the inner armature, the isolating element being formed of a material that is more flexible than the outer armature and the inner armature to permit relative movement between the outer armature and inner armature, wherein the main rubber element defines at least part of a fluid flow path having a first end and a second end;
a hydraulic body connected to the housing and having a first face adjacent to the outer armature of the main rubber element and an outer face opposite to the first face, the hydraulic body defining part of the fluid flow path, the hydraulic body having a first cavity that extends into the hydraulic body from the outer face that defines at least part of a fluid chamber that is communicated with the fluid flow path, the hydraulic body having a second void formed in the first face and defining part of a control chamber, and the hydraulic body having a port open to the control chamber, and the hydraulic body having a valve cavity that extends into the hydraulic body from the outer face and that is open to the port, spaced from and separate from the first cavity;
a membrane defining part of the control chamber and arranged between the port and the fluid flow path so that fluid in the fluid flow path does not flow through the port; and
a valve having a valve head movable relative to the port between a first position closing the port and a second position spaced from the port.

12. The assembly of claim 11 which also includes a cover between the first face of the hydraulic body and the main rubber element, wherein the fluid flow path is defined at least in part by a groove formed in the first face of the hydraulic body and the cover overlaps the groove, and the cover includes a first opening that communicates with the groove and another fluid chamber defined at least in part by the cover and the main rubber element, and the cover includes a second opening through which said another fluid chamber communicates with the membrane.

13. The assembly of claim 11 wherein the valve head engages the hydraulic body to close the port in the first position.

14. The assembly of claim 11 wherein air is present within the control chamber and when the valve head is in the first position the valve head inhibits or prevents air from flowing through the port to inhibit or prevent movement of the membrane.

15. The assembly of claim 11 wherein the membrane is carried by and sealed to the hydraulic body, and wherein the control chamber is formed in the first face of the hydraulic body and is aligned with the valve cavity.

16. The assembly of claim 11 wherein the membrane is formed from an elastic material and part of the membrane moves relative to the port, and wherein when the valve head is in the second position and fluid in the fluid flow path acts on the membrane, the membrane flexes relative to the fluid flow path and inhibits or prevents fluid flow in the fluid flow path.

17. The assembly of claim 16 wherein when the valve head is in the first position air in the control chamber cannot exit the control chamber through the port and the membrane is inhibited or prevented from movement toward the port, and the membrane permits fluid flow in the fluid flow path.

18. The assembly of claim 17 wherein movement between the inner armature and the outer armature is suppressed when the valve head is in the first position compared to when the valve head is in the second position.

* * * * *